INVENTOR
Arthur H. Long

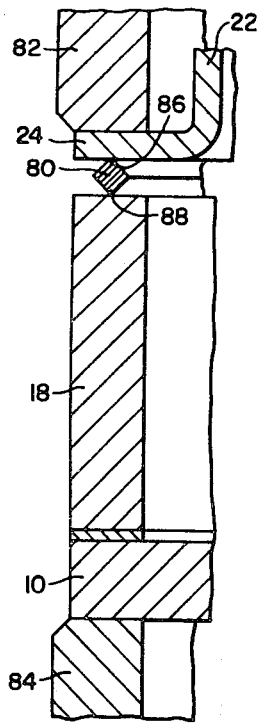
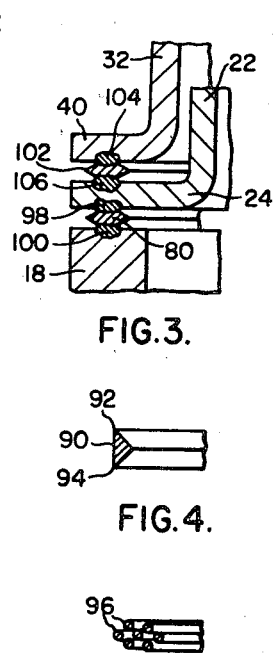
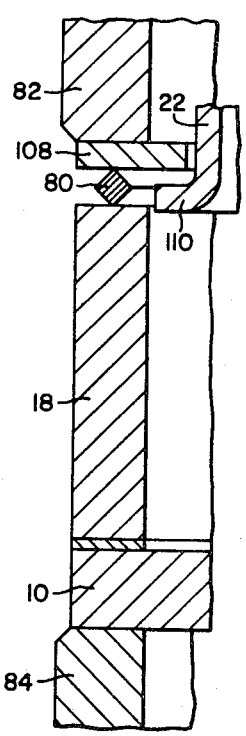
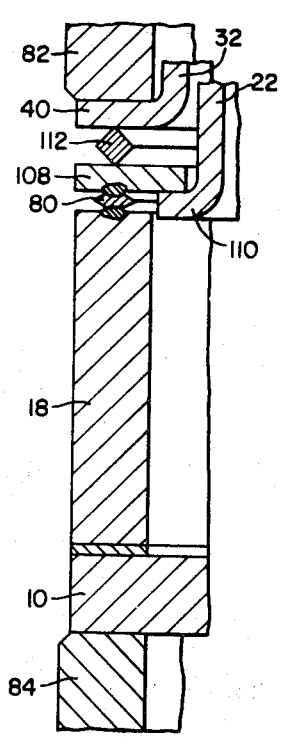
FIG.2.    FIG.3.    FIG.4.    FIG.5.    FIG.6.    FIG.7.
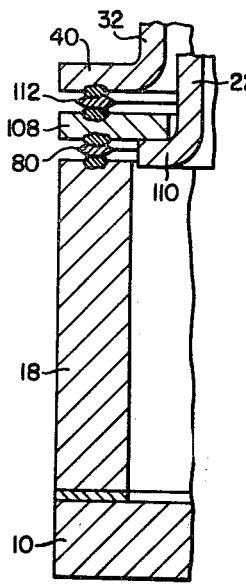
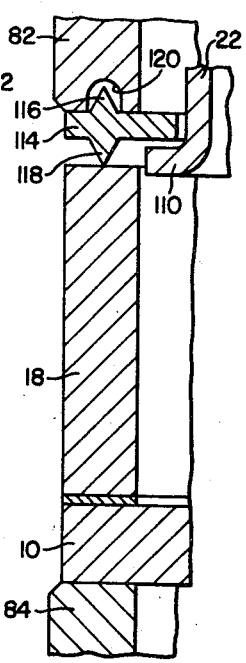
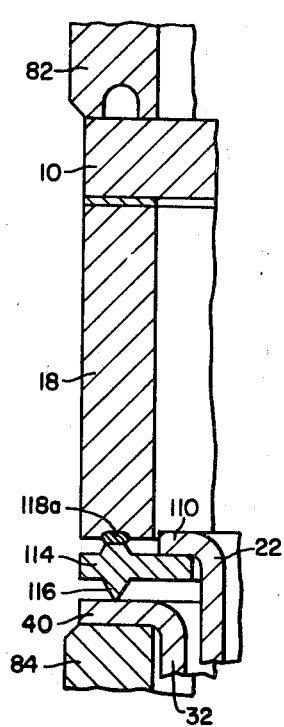
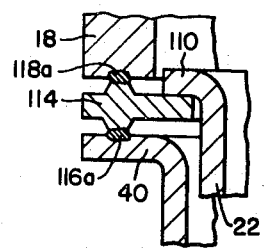
FIG.8.    FIG.9.    FIG.10.    FIG.11.

3,534,233
HERMETICALLY SEALED ELECTRICAL DEVICE
Arthur H. Long, Jeannette, Pa., assignor to Westinghouse Electric Corporation, Pittsburgh, Pa., a corporation of Pennsylvania
Continuation-in-part of application Ser. No. 670,870, Sept. 27, 1967. This application June 28, 1968, Ser. No. 741,071
Int. Cl. H01l 1/06
U.S. Cl. 317—234                     8 Claims

ABSTRACT OF THE DISCLOSURE

A hermetically sealed case member for an electrical device including a base member having a semiconductor-supporting surface and having a peripheral weld flange around the surface, a header having a peripheral weld flange coextensive with the weld flange on the base member, a weld ring disposed between the flanges and having upper and lower edges welded to the header flange and the base flange respectively, and the weld ring being composed of a metal having an electrical resistivity ranging from about 6 to $14 \times 10^{-6}$ ohm-cm.

CROSS REFERENCES TO RELATED APPLICATION AND PATENTS

This invention is a continuation-in-part of copending application Ser. No. 670,870, filed Sept. 27, 1967, now abandoned, and is related to U.S. Pat. Nos. 2,825,014; 2,864,980; 2,880,383; and 3,005,867.

BACKGROUND OF THE INVENTION

The joining of components for the hermetic encapsulation of semiconductor device packaging invloves the technique of electrical resistance welding. This technique usually provides highly reliable metallurgical joints that exhibit mechanical properties exceeding those of the components to be joined. Another advantage is an encapsulated package assembly of hermeticities of the order of $1 \times 10^{-6}$ cc./sec. of helium. In addition, the technique maintains the device at near room temperature with a minimum evolution of volatile byproducts of the internal package assembly.

Resistance welding requires that at least one of the components to be joined must be composed of a material possessing a high electrical resistivity such as approximately $10 \times 10^{-6}$ ohm-cm. For example, iron and ferrous base alloys have such a resistivity and function well as a weld projection material. On the other hand, copper having a resistivity of approximately 1.7 times $10^{-6}$ ohm-cm. is unsatisfactory.

Associated with the foregoing is an additional requirement that the component be composed of a material having the proper resistivity also be provided with a weld projection of a small cross sectional area which extends completely around the area to be enclosed, thereby providing a hermetic encapsulation. During the welding process a large amount of current passes through the weld electrodes and is concentrated at the weld projection at the interfaces of the components to be joined, causing the melting of the weld projection which upon subsequent cooling forms a welded junction. The above-mentioned patents disclose the structure and techniques for providing such a welded joint.

One disadvantage of those prior art structures is that the weld projection is an integral part of one of the members to be joined, such as shown in Pat. Nos. 2,825,014, and 2,880,383, thereby requiring that the entire component be composed of the same material of which the weld projection must be composed and entails an additional cost of providing the weld projection. Moreover, additional care and expense of packaging is involved after the projection is made on the component to prevent the projection from being damaged prior to the welding operation which would result in an incomplete weld and the lack of an hermetically sealed device.

Prior attempts to improve the foregoing structure have been made, such as disclosed in U.S. Pat. No. 3,005,867, in which separate ring members composed of the appropriate material for resistance welding were added to one of the components to be joined. A disadvantage with such construction is that extra cost is involved in preliminarily providing one of the components to be joined with a ring-receiving groove and subsequently soldering the ring into the groove.

In accordance with this invention it has been found that the foregoing problems and disadvantages may be overcome by providing components to be joined which are devoid of the weld ring either as an integral part of or added to one of the components and inserting a weld ring as a separate part between the components to be joined immediately prior to welding. Such a separate weld ring may not only be composed of a material having the required high electrical resistivity, but has a very small cross sectional area which is conductive to rapid heating and fusion of the ring to the adjacent metal components to provide a hermetic seal.

By providing a separate weld ring having a minimum cross sectional area and high electrical resistivity, the component parts to be poined may be manufactured and shipped and subsequently handled prior to assembly with a minimum of care and expense for providing and preserving the weld ring as an integral part of one of the components. Moreover, a separate weld ring involves other advantages such as the elimination of a brazing operation between other components instead of at other locations which were not possible with components having an integral weld ring provided.

Accordingly, it is a general object of this invention to provide a hermetically sealed electrical device, the outer case components of which are joined together by a separate weld ring disposed between the joined components.

It is another object of this invention to provide an hermetically sealed electrical device in which a separate weld ring is used for providing a continuous welding junction between certain housing components which ring is composed of a metal having high electrical resistance and has a relatively small cross sectional area.

Finally it is an object of this invention to satisfy the foregoing objects and desiderata in a simple and effective manner.

SUMMARY OF THE INVENTION

The hermetically sealed electrical device of the present invention comprises a base and a header joined to form a chamber for containing electrical parts, the base and header each having a peripheral weld surface coextensive with each other and completely surrounding the chamber, a weld ring between the weld surface of the base and header and diffused or bonded to the weld surfaces on upper and lower sides of the ring, and the ring being composed of a metal having an electrical resistivity ranging from about 6 to $14 \times 10^{-6}$ ohm-cm.

BRIEF DESCRIPTION OF THE DRAWINGS

For a better understanding of the nature and objects of this invention, reference is made to the drawings, in which:

FIG. 2 is an enlarged fragmentary view showing the configuration and location of a weld ring immediately prior to the welding operation;

FIG. 3 is a sectional fragmentary view of the weld ring immediately after the resistance welding operation;

FIGS. 4 and 5 show the configuration of other embodiments of the weld ring;

FIG. 6 is a sectional fragmentary view of another embodiment of the invention showing a weld ring in combination with a weld disc for performing the first step of a welding operation;

FIG. 7 is a sectional fragmentary view showing the next step of the operation shown in FIG. 6 wherein the first step of the weld is accomplished and the assembly is welded to accomplish the second step by adding a second welding ring;

FIG. 8 is a sectional fragmentary view showing the condition immediately after the welding step shown in FIG. 7;

FIG. 9 is a sectional fragmentary view of another embodiment of the invention showing a welding disc having oppositely disposed weld ridges for welding in a two-step-operation, and showing the use of a notched electrode for receiving one of the weld ridges without deforming it during a first step of the welding procedure;

FIG. 10 is a sectional fragmentary view showing the assembly inverted with the first step of the weld accomplished and immediately prior to the second welding operation; and FIG. 11 is a sectional fragmentary view of the assembly shown in FIG. 10 immediately after the second welding operation.

Similar numerals refer to similar parts throughout the several views of the drawings.

DESCRIPTION OF THE PREFERRED EMBODIMENTS

Figure 1:
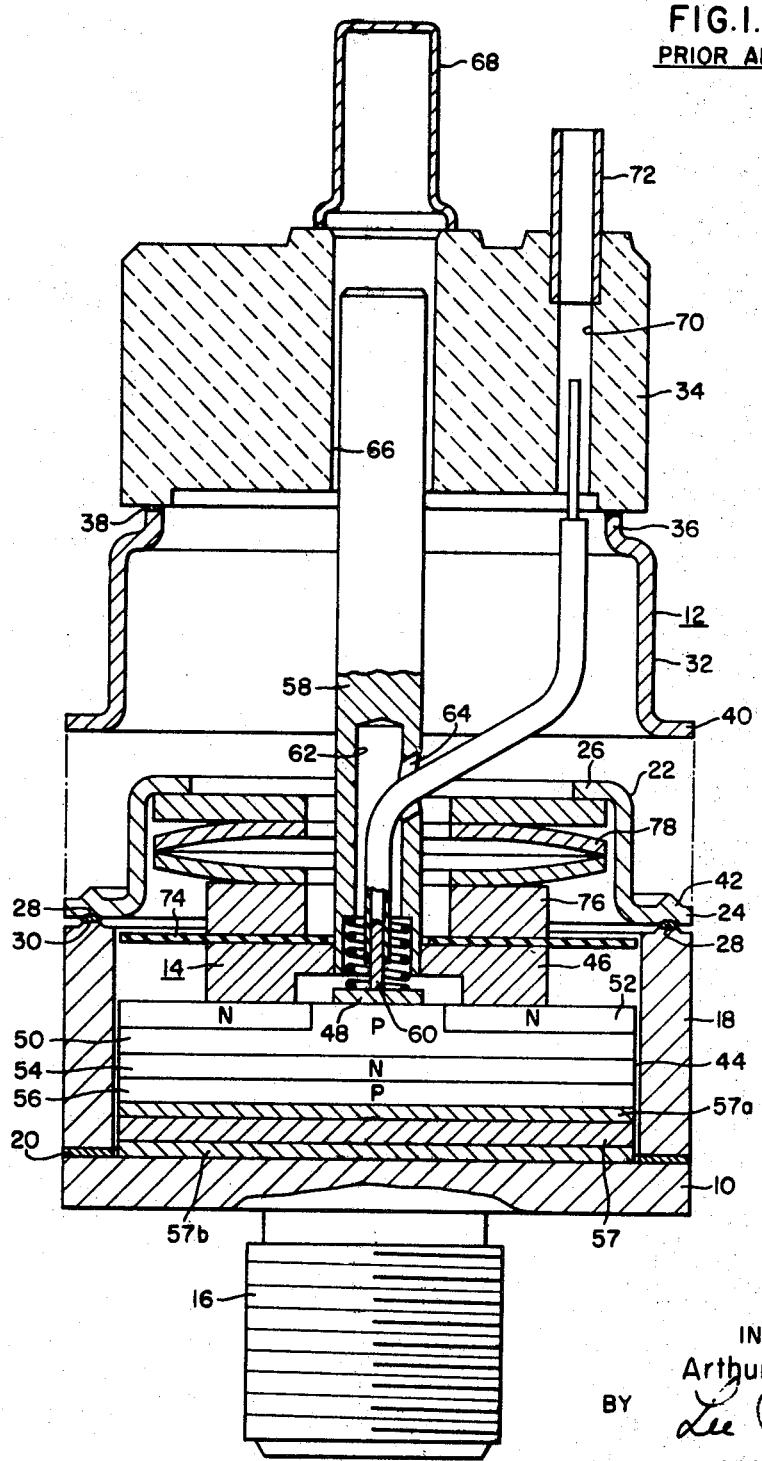
FIG. 1 is a longitudinal sectional view of a prior art device which is partially exploded to show the manner in which the header is attached to the base of the device.

In FIG. 1 a device of prior art construction is shown having a base 10, a header 12, and an electrical element 14. The base 10 has a stud portion 16 and a central surface area thereon for supporting a semiconductor element. The base 10 is composed of a metal having a high coefficient of thermal conductivity such as copper. A prepared metallic layer 20 is applied such as by evaporation, brazing, or plating onto the base 10. A tubular housing 18 is mounted on the base where it is secured by an air-tight joint at 20 such as by brazing. The base 10 and the housing 18 comprises a base member. The housing 18 has an upper end surface that surrounds the central surface area of the base 10. The housing 18 is composed of a metal preferably having an electrical resistivity ranging from 6 to $14 \times 10^{-6}$ ohm-cm. such as nickel and steel.

A tubular retainer 22 is disposed at the upper end of the housing 18 and has an out-turned lower flange 24 and an in-turned upper flange 26. The retainer 22 is secured to an upper end surface of the housing 18 by a peripheral resistance weld 28 at the upper end of a knife-edge ridge 30 which extends upwardly from the upper end surface of the retainer and which is an integral part of the housing 18.

The header 12 includes a sleeve 32 and an insulating cap 34 the upper end 36 of the sleeve 32 is secured to the cap 34 in a sealed manner such as by brazing at 38. The lower edge of the sleeve 32 includes an out-turned flange 40 which when lowered into final position, is secured to an upper surface of the flange 24 by a peripheral resistance weld (not shown) at the upper end of a knife-edge ridge 42 which is similar to the ridge 30 on the housing 18.

The electrical elements 14 includes a body of semiconductor material or wafer 44, an emitter contact 46, and a base contact 48. The wafer 44 includes P-N-P-N regions 50, 52, 54, and 56 respectively, the lower surface of the P region 56 is soldered at 57a to a metal contact 57 which in turn is compression bonded at 57b to the upper surface of the base 10. The emitter contact 46 is disposed at the lower end of an elongated electrode 58. The base contact 48 is attached to the lower end of a gate lead 60 having an insulation sleeve which lead extends upwardly through a bore 62 within the lower end of the electrode 58 and through an opening 64 as shown in FIG. 1. The upper end of the electrode 58 extends through a bore 66 in the ceramic cap 34 and into an electrode cover 68 on the upper surface of the cap 34. Similarly, the upper end portion of the gate lead 60 extends through a bore 70 in the cap 34 and through a sleeve 72 by which the interior of the assembled device is evacuated in a final step of the assembly.

During the assembly the contacts 46 and 48 are placed in the position shown in FIG. 1 where they are retained by a spacer disc 74 which is composed of an insulating material such as mica. A thrust washer 76 and a Belleville spring assembly 78 are placed upon the disc 74 and a compressive force is applied to the springs by welding the lower flange 24 to the upper edge of the housing 18 such as by the application of a compressive force by means of annular electrodes (FIGS. 2–11) by which the weld 28 is obtained by electrical resistance welding methods. Thus, the contact 46 is held in a compression bonded relationship with the region 52 of the wafer 44.

Before the header 12 is attached in place the preliminary assembly is tested to determine the existence of a satisfactory compression bond between the contacts 46 and 48, the wafer 44, and the base 10.

After satisfying the preliminary assembly test the header 12 is seated in place with the out-turned flange 40 brought into contact with the ridge 42 for electric resistance welding. That is the header 12 is lowered from the exploded position shown in FIG. 1 and the upper end portion of the electrode 58 is inserted into the bore 66 and the cover 68. Likewise the gate lead 60 extends into the sleeve 72.

The above described structure constitutes the prior art in which weld ridges 30 and 42 as integral parts of components having other purposes are used for providing a hermetically sealed semiconductor device.

In accordance with this invention it has been found that weld means separate from regular components of a device may be substituted for the weld ridges 30 and 42 that were an integral part of the prior art components. The weld means include weld rings, disc and/or weld discs as described below. The advantages, derived from the use of separate weld rings, are evident from the several embodiments shown in FIGS. 2 to 11 and described hereinbelow.

As shown in FIG. 2, a separate weld ring 80 is placed between the upper end surface of the housing 18 and the flange 24 of the retainer 22. The subassembly of the housing, weld ring, and flange is mounted between a pair of oppositely disposed electrodes 82 and 84 which have a tubular configuration corresponding to that of the subassembly.

The cross section of the ring 80 has a diamond shape of which upper and lower edges 86 and 88 are the apexes of converging sides of the ring, the edges being in contact with the surfaces of the flange 24 and the housing 18.

Weld rings may have other configurations than the diamond shape of the ring 80. Other configurations are shown in FIGS. 4 and 5 in which a weld ring 90 (FIG. 4) has a triangular cross section with upper and lower weld edges 92 and 94 corresponding to the edges 86 and 88 of weld ring 80. Moreover, it has been found that several coils 96 of wire may be used. For that purpose each coil 96 may have a round cross section. The basic configuration requirement of the weld ring is that it may have upper and lower edges which make line, or substantially, line contacts with the members to which the rings are welded rather than having a flat surface which presents a surface interface with the members to which they are welded. Although the diamond cross sectional ring 80 having upper and lower edges 86 and 88 and the triangular cross sectional ring 90 having upper and lower edges 92 and 94 present line contacts with the adjacent members to which they are welded.

The welding step is a resistance welding operation in which the electrodes 82 and 84 are pressed together with a force of about 3500 pounds to maintain the several parts 24, 80 and 18 in tight contact. A current of about 70,000 amperes is passed through the electrodes and the parts, causing the upper and lower edges 86 and 88 to melt and fuse and weld to the flange 24 and the upper surface of the housing 18 respectively. The weld on the upper and lower edges of the ring 80 occurs completely around the entire lines of contact between the ring 80 and the flanges 24 and housing 18 thereby producing a hermetic seal between the flange and the housing. During the welding the entire ring 80 is heated and slightly deformed under the compressive pressure of the electrodes 82 and 84 and the upper and lower edges form welds 98 and 100 as shown in FIG. 3.

After the weld ring 80 is secured in place a second weld ring 102 is used in a similar manner to secure the tubular sleeve 32 having flange 40 in place as shown. Thus, during welding of the ring 102 the flange 40 is secured by the weld 104 to the ring 102 and likewise the flange 24 is secured by weld 106 to the ring 102.

Weld means of a modified form are shown in FIG. 6 which may be used where the tubular retainer 22 is modified to be provided with a short flange 108. For some applications of the retainer 22 it is necessary to mount the retainer without welding it directly to the housing 18 as shown in FIG. 2. Accordingly, a disc 108 is used with the weld ring 80 so that the inner edge portion of the disc overlaps the outwardly extending flange 110 of the retainer 22. When the weld of the ring 80 is completed, the retainer 22 is held in place with the disc 108 intact.

The subassembly is then ready for a preliminary test before the final assembly as described above with regard to FIG. 1. After the test the header is attached by a resistance weld procedure using a separate weld ring 112 for attaching the flange 40 of the sleeve 32 on the header 12 in place in a hermetically sealed manner. After the resistance weld operation the electrodes 82 and 84 are removed and the assembly has a structure as shown in FIG. 8 with upper and lower edges welded in a manner similar to that described for the weld ring 80 in FIG. 3.

Another embodiment of the invention is shown in FIGS. 9 to 11 in which a weld disc 114 having an upper and lower weld ridge 116 and 118 is used instead of a pair of weld rings and disc similar to that shown in FIG. 8. As shown in FIG. 9 one electrode 82 is provided with an annular groove 120 disposed over the upper weld ridge 116 in such a manner as to provide complete clearance between the electrode and the ridge but permitting contact between the lower end surfaces of the electrode with the upper surface of the disc 114. Accordingly, when the resistance welding operation occurs, the lower ridge 118 is mounted and welded to the upper end of the housing 118 for the purpose of securing the disc 114 in place and thereby obtaining the first subassembly with the retainer 118 in place in a manner similar to that shown in FIG. 7. Thereafter the entire subassembly is inverted as shown in FIG. 10 between the electrodes 82 and 84 and the flange 40 of the sleeve 32 of the header is mounted on the lower electrode 84 with the weld ridge 116 in place and with the completed weld 118a in the upper position. After welding the lower ridge 116 is deformed as shown at the completed weld 116a in FIG. 11 and the assembly of the device is completed.

It is understood that although the foregoing discloses a method for hermetically encapsulating a semiconductor device, other electrical devices may be similarly encapsulated by the welding procedures involved.

Moreover, it is understood that although the several parts of the device including the housing 18, retainer 22 and sleeve 32 are described as being round or annular members, any other configuration such as square may be substituted.

Accordingly, the prior method of providing weld rings that were integral with one or more of the components of a device to be assembled may be eliminated by the replacement of separate weld means including weld rings and/or discs having a composition suitable for resistance welding such as of a metal having an electrical resistivity ranging from about 6 to $14 \times 10^{-6}$ ohm-cm. and different from the composition of metal preferred for one or both of the components.

Various modifications may be made within the spirit of the invention.

What is claimed is:

1. In a semiconductor device comprising a base member having a central surface portion, a header member mounted on the base member for hermetically sealing a semiconductor between the members, and a retainer between the semiconductor and the header member for holding the semiconductor fixedly in place on the central surface portion, the improvement comprising the base member having a first weld surface surrounding the central surface portion, the header member having a second weld surface coextensive with the first weld surface, the retainer being attached to the base member, weld means having a first annular portion welded to the first weld surface and holding the retainer in place, the weld means also having a second annular portion welded to the second weld surface, and the weld means being separate from the members and insertable in place prior to being welded.

2. The weld means of claim 1 being composed of a metal and having an electrical resistivity range from about 6 to $14 \times 10^{-6}$ ohm-cm.

3. The weld means of claim 2 including at least one solid metal member.

4. The weld means of claim 2 including a composite of a plurality of solid metal members.

5. The weld means of claim 3 in which the member includes upper and lower edges welded to the second and first weld surface respectively.

6. The weld means of claim 2 including a continuous disc between the first and second annular portions.

7. The weld means of claim 6 in which the upper and lower edges are integral parts of the disc and on opposite sides thereof.

8. The weld means of claim 2 including an annular metal disc, one annular metal member above the disc, another annular metal member below the disc, the one member having upper and lower edges welded to the second weld surface and to the disc respectively, and the other member having upper and lower edges welded to the disc and to the first weld surface respectively.

References Cited

UNITED STATES PATENTS

| 3,005,867 | 10/1961 | Green et al. | 174—50.54 |
| 3,170,098 | 2/1965 | Marino | 317—234 |
| 3,296,506 | 1/1967 | Steinmetz et al. | 317—234 |

FOREIGN PATENTS 739,492  11/1955  Great Britain.

JAMES D. KALLAM, Primary Examiner

U.S. Cl. X.R.

29—576